March 29, 1966   J. W. LUCAS, JR   3,243,094
WELDING FIXTURE

Filed Nov. 13, 1964   3 Sheets-Sheet 2

INVENTOR.
JOHN W. LUCAS, JR.
BY Lyon & Lyon
ATTORNEYS

March 29, 1966  J. W. LUCAS, JR  3,243,094
WELDING FIXTURE
Filed Nov. 13, 1964  3 Sheets-Sheet 3
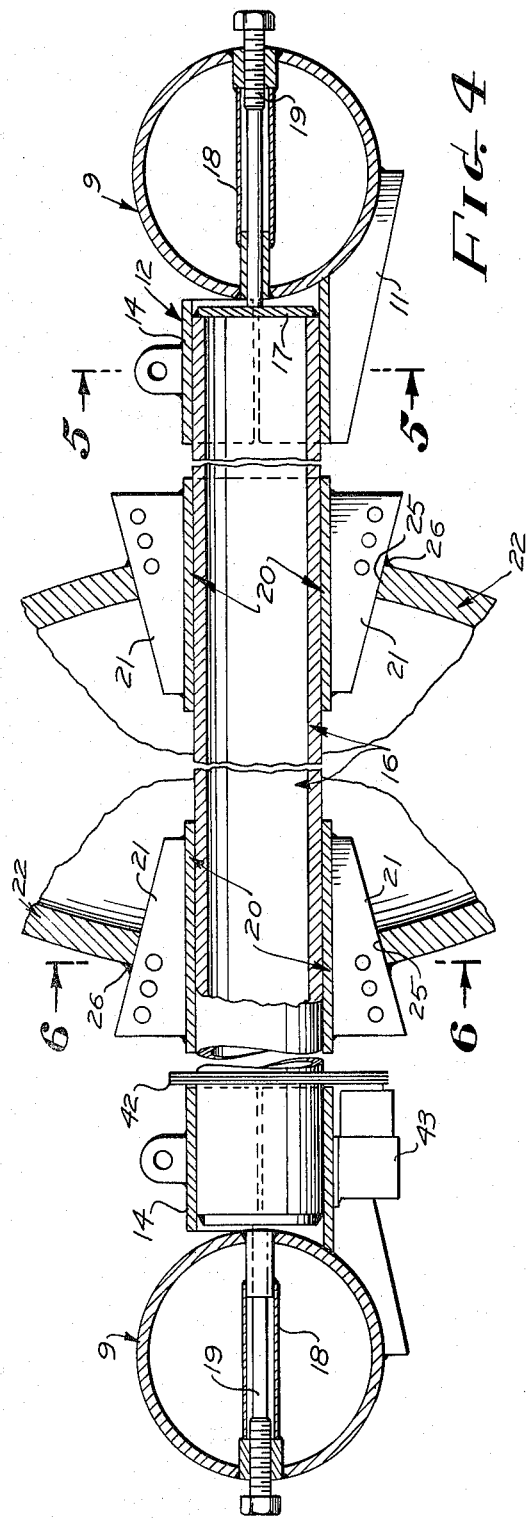
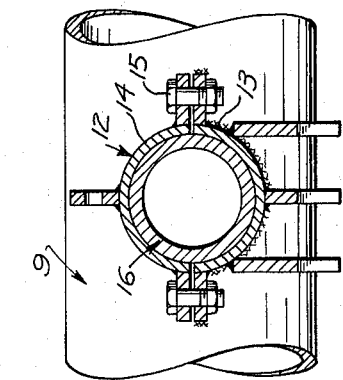
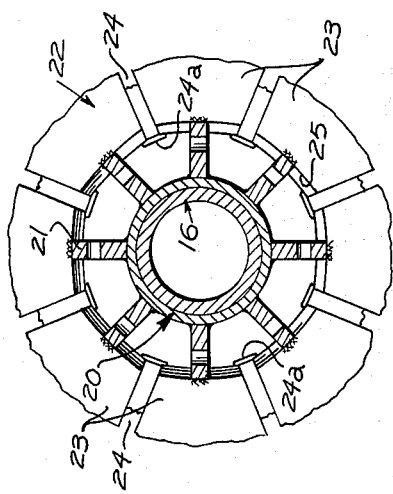
INVENTOR.
JOHN W. LUCAS, JR.
BY
ATTORNEYS United States Patent Office 3,243,094
Patented Mar. 29, 1966

3,243,094
WELDING FIXTURE
John W. Lucas, Jr., Los Angeles, Calif. (% Southwest Welding & Mfg., 3201 W. Mission Road, Alhambra, Calif.)
Filed Nov. 13, 1964, Ser. No. 410,894
6 Claims. (Cl. 228—47)

First, to provide a welding fixture which is particularly adapted for the welding of spherical vessels formed of "orange peel" segments and intended to contain gas or liquefied gas under high pressure.

Second, to provide a welding fixture which permits welding of the seams which join the segments of the spherical vessel.

Third, to provide a welding fixture wherein the spherical vessel is supported on a shaft, journalled within a tubular ring structure that is, in turn, mounted on trunnions for rotation about an axis at right angles to the journal shaft.

Fourth, to provide a welding fixture wherein the trunnions are readily removable from their supports and the journal shaft is readily removable from the ring structure to facilitate the welding of a succession of spherical vessels.

Fifth, to provide a novel means for mounting the spherical pressure vessel on its shaft, which may be readily modified to accommodate vessels of different diameter.

With the above and other objects in view, as may appear hereinafter, reference is directed to the accompanying drawings in which:

FIGURE 4 is an enlarged fragmentary longitudinal sectional view taken through 4—4 of FIGURE 2.

FIGURE 5 is a fragmentary transverse sectional view taken through 5—5 of FIGURE 4.

FIGURE 6 is a fragmentary transverse sectional view taken through 6—6 of FIGURE 4.

Figure 1:
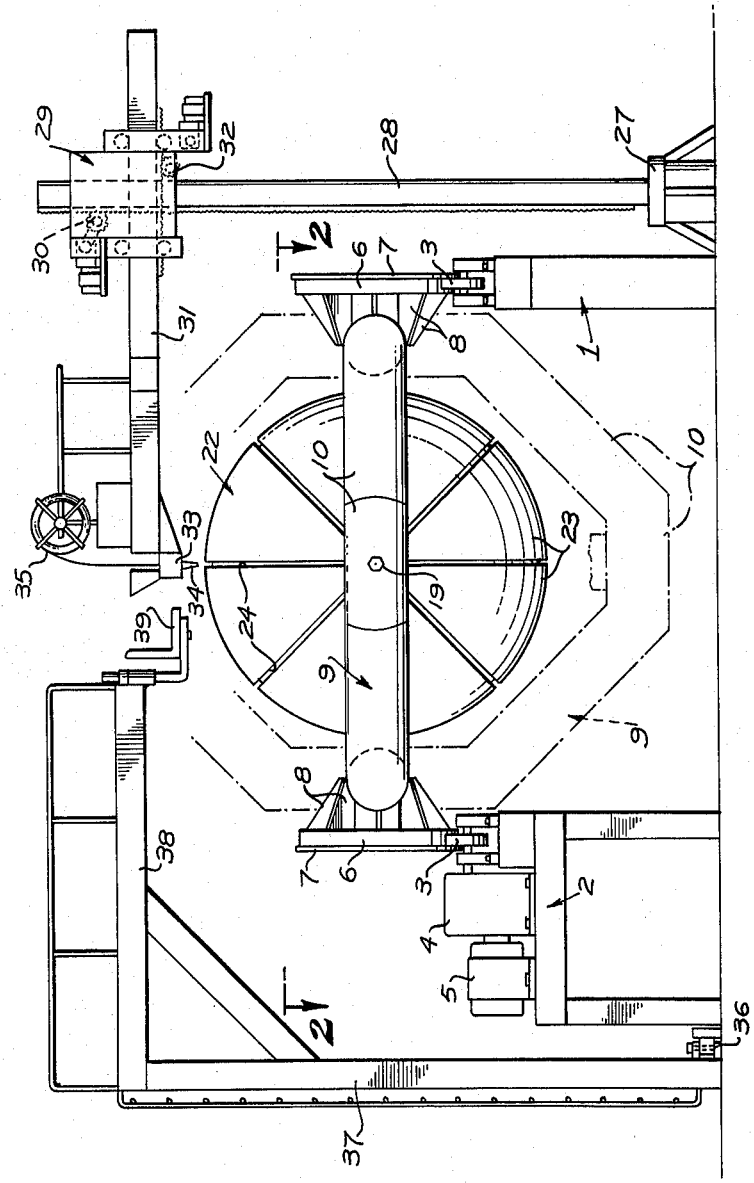
FIGURE 1 is a side elevational view of the welding fixture.
Figure 2:
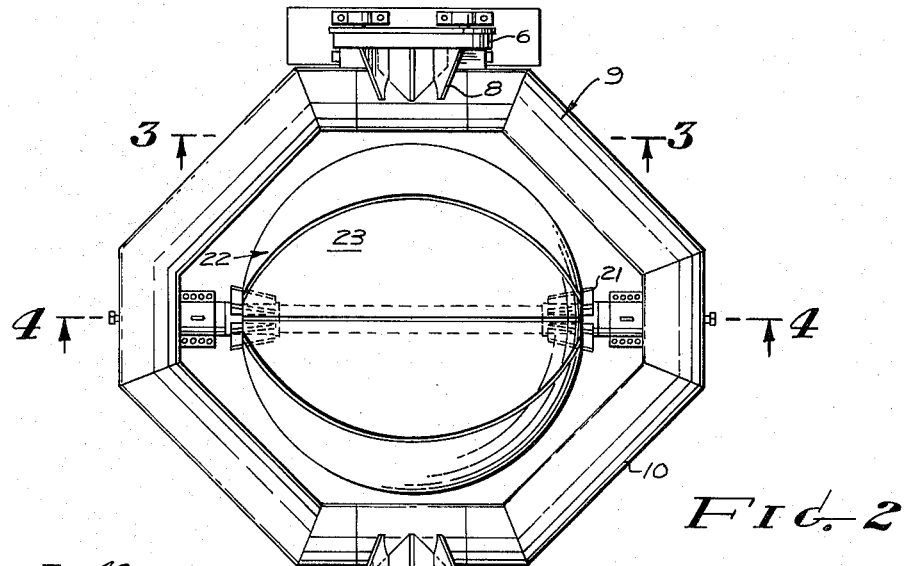
FIGURE 2 is a top or plan view thereof taken substantially from 2—2 of FIGURE 1.

The welding fixture includes a cradle post 1 and a cradle frame 2, each of which is provided with a pair of cradle wheels 3. Mounted on the cradle frame 2 is a gear unit 4 and a drive motor 5 connected to at least one of the cradle wheels.

The two pair of cradle wheels 3 support trunnion wheels 6 having flanges 7. The trunnion wheels are joined by gussets 8 to a ring structure 9. The ring structure is preferably formed of several sections 10 of tubing beveled at their extremities and joined together to define an eight-sided figure. The trunnions are joined to two diametrically disposed sections. Two of the sections disposed ninety degrees to the trunnion attached sections are provided with aligned radially inwardly extending brackets 11. Each bracket 11 supports a longitudinally split journal 12 comprising a fixed portion 13 welded to the bracket 11 and a removable portion 14. The two portions of each journal are provided with outwardly extending flanges joined together by bolts 15.

The pair of split journals are disposed in coaxial relation and journal the ends of a tubular shaft 16. The ends of the shaft are closed by plates 17 and the adjacent portions of the ring structure are provided with coaxial tubes 18 which are internally threaded to receive thrust bolts 19 adapted to bear against the corresponding end plate 17 of the shaft 16 so as to restrict the shaft against endwise movement.

The shaft 16 receives a pair of sleeves 20 having radial ribs 21, the extremities of which taper so that the ribs define a conical structure. The sleeves are tack welded or otherwise temporarily secured to the shaft 16. The conical structure as formed by the sets of radial ribs 21 forms wedges which are adapted to support a pressure vessel 22. The pressure vessel is spherical and comprises a plurality of segments 23. The segments are of the "orange peel" type, that is they define therebetween planes which pass through the axis of the shaft 16. Initially these segments are separated by channels 24 which are bridged by strips 24a tack welded to these segments so that the pressure vessel may be handled as a unit.

The polar ends of the segments form diametrically disposed apertures 25 which fit the conical structures formed by the sets of radial ribs 21 as shown best in FIGURE 4. The segments may be tack welded as indicated by tack welds 26 to the ribs 21.

Disposed at one side of the cradle post 1 is a journal base 27 which rotatably supports a vertical post 28. Mounted on the post 28 is a carriage 29 adapted for vertical travel on the post by means of a rack and pinion drive 30. Extending horizontally from the carriage 29 is an arm 31 capable of being extended and retracted by means of a rack and pinion drive 32. Mounted at the extended end of the arm 31 is a welding unit 33 which includes a welding torch 34 and a reel 35 for supplying a welding rod to the torch. At the other side of the welding fixture structure is a pivot mounting 36 supporting a vertical post 37 which carries a beam 38 at the extremity of which is a welder's chair 39 for use by the operator during the welding operation.

The welding fixture is employed as follows:

Prior to installation in the welding fixture, the pressure vessel is assembled from its segments 23 and its segments are tack welded to each other. The shaft 16, which is removed from the welding fixture, is inserted through the aperture in the pressure vessel and the sleeves with their sets of radial ribs 21 are inserted in the apertures 25 so as to bring the axis of the pressure vessel in coincidence with the axis of the shaft. The pressure vessel is also adjusted axially on the shaft 16 so that its transverse axis coincides with the common axis of the trunnion wheels 6. When the pressure vessel has been properly positioned, it is secured in such a position by tack welds.

The pressure vessel and shaft are placed within the ring structure 9 with the ends of the shaft resting on the fixed portions of the split journals 12. The thrust bolts may be used to effect axial adjustment of the shaft for alignment of an axis of the pressure vessel 22 with the trunnion wheels 6.

One of the channels 24 which defines a diametrical plane through the pressure vessel is positioned so that it is perpendicular to the axis through the trunnion wheels and the torch is positioned so as to discharge into the channel. When this is accomplished, the trunnion wheels 6 may be rotated slowly under control of the drive motor 5 causing the welding torch to travel along a selected channel 24 as the pressure vessel is rotated. If desired, the welding torch may be set at the starting end of one of the channels and may be caused to weld automatically as it traverses along the channel. Control means (not shown) for the motor 5 as well as the motors carried by the carriage 29 may be located in proximity to the welding unit for use by the welder.

Figure 8:
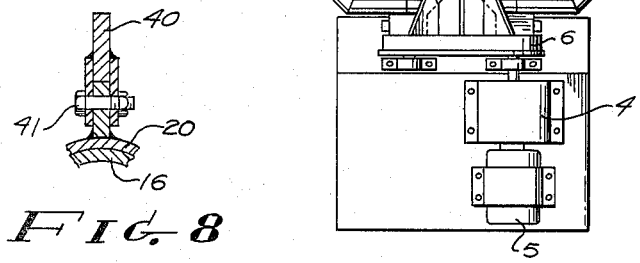
FIGURE 8 is a fragmentary sectional view thereof taken through 8—8 of FIGURE 7.
Figure 7:
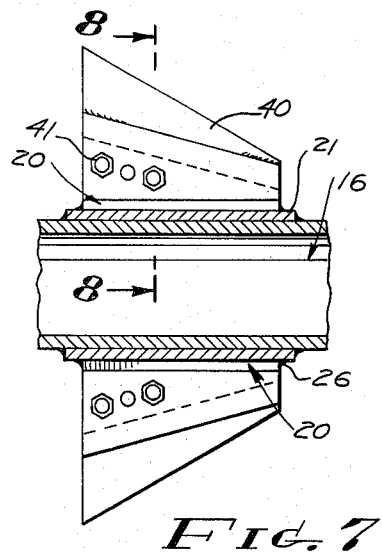
FIGURE 7 is a fragmentary sectional view similar to the portion of FIGURE 4 showing a modified means of connection between the supporting shaft and the pressure vessel.
Figure 3:
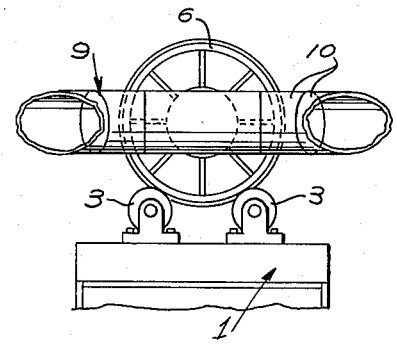
FIGURE 3 is a fragmentary sectional view taken through 3—3 of FIGURE 2.

The welding fixture may support spherical pressure vessels of different diameters and consequently the apertures 25 also vary in diameter to accommodate spheres of larger size. The radial ribs 21 may receive radial extensions 40 secured thereto by bolts 41 as shown in FIGURES 7 and 8.

If desired, the shaft 16 may be motor driven by means of a chain 42 and a gear motor 43 as indicated in FIGURE 4. With this arrangement, rotation about the axis of the trunnion wheels 6 may be programmed so that the structure to be welded may move in any desired path under the welding head.

While the welding fixture is particularly adapted for the welding of spherical structures, it may also be employed to weld structures of different shapes.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A welding fixture for spherical pressure vessels formed of segments defining planes passing through a common axis, said welding fixture comprising:
   (a) a shaft having an axis adapted to coincide with said common axis and having opposite ends adapted to extend from said pressure vessel;
   (b) means for securing said vessel on said shaft;
   (c) a ring structure journalling the ends of said shaft;
   (d) a pair of trunnion wheels secured to said ring structure and defining an axis at right angles to said shaft axis;
   (e) and cradle wheels supporting said trunnion wheels for rotation about their common axis.

2. A welding fixture for spherical pressure vessels formed of segments defining planes passing through a common axis, said welding fixture comprising:
   (a) a shaft having an axis adapted to coincide with said common axis and having opposite ends adapted to extend from said pressure vessel;
   (b) means for securing said vessel on said shaft;
   (c) a ring structure journalling the ends of said shaft;
   (d) means for journalling said ring about an axis disposed ninety degrees with respect to said shaft axis;
   (e) a welding unit;
   (f) and means for supporting said welding unit in a plane passing through said shaft axis and perpendicular to the axis of said ring journalling means.

3. A welding fixture for spherical pressure vessels formed of segments defining planes passing through a common axis, said welding fixture comprising:
   (a) a shaft having an axis adapted to coincide with said common axis and having opposite ends adapted to extend from said pressure vessel;
   (b) means for securing said vessel on said shaft;
   (c) a ring structure journalling the ends of said shaft;
   (d) a pair of trunnion wheels secured to said ring structure and defining an axis at right angles to said shaft axis;
   (e) cradle wheels supporting said trunnion wheels for rotation about their common axis;
   (f) a welding unit;
   (g) and means for supporting said welding unit in a plane passing through said shaft axis and perpendicular to the axis of said trunnions.

4. A welding fixture for spherical pressure vessels formed of segments defining planes passing through a common axis, said welding fixture comprising:
   (a) a shaft having an axis adapted to coincide with said common axis and having opposite ends adapted to extend from said pressure vessel;
   (b) a pair of sleeves mounted on said shaft and having radial ribs defining a conical figure, insertable into diametrically disposed openings in said vessel for centering said pressure vessel on said shaft;
   (c) a ring structure journalling the ends of said shaft;
   (d) a pair of trunnion wheels secured to said ring structure and defining an axis at right angles to said shaft axis;
   (e) and cradle wheels supporting said trunnion wheels for rotation about their common axis.

5. A welding fixture, comprising:
   (a) a pair of spaced supporting pedestals;
   (b) a ring structure having radially outwardly directed journalling means for defining a diametrical axis and rotatably supported on said pedestals;
   (c) a shaft extending diametrically across said ring structure and defining an axis of rotation perpendicular to said journalling means;
   (d) a means for supporting a structure to be welded on said shaft for rotation about both of said axes;
   (e) a welding unit;
   (f) and means for supporting said welding unit in a plane passing through said shaft axis and perpendicular to the axis of said ring journalling means.

6. A welding fixture, comprising:
   (a) a pair of spaced supporting pedestals;
   (b) a ring structure having radially outwardly directed journalling means for defining a diametrical axis and rotatably supported on said pedestals;
   (c) a shaft extending diametrically across said ring structure and defining an axis of rotation perpendicular to said journalling means;
   (d) a means for supporting a structure to be welded on said shaft for rotation about both of said axes;
   (e) means for supporting a welding unit over said structure;
   (f) a welding unit supported by said means;
   (g) and means for rotating said structure about at least one of said axes to cause a path to be welded to pass under said welding unit.

References Cited by the Examiner
UNITED STATES PATENTS

| | | | |
|---|---|---|---|
| 437,453 | 9/1890 | Ranney | 228—38 |
| 662,484 | 11/1900 | Ziehl | 35—46 |
| 831,095 | 9/1906 | Polson | 269—52 |
| 2,493,043 | 1/1950 | Stipsky | 248—184 |

WHITMORE A. WILTZ, *Primary Examiner.*

M. L. FAIGUS, *Assistant Examiner.*